US011488374B1

(12) United States Patent
Sun et al.

(10) Patent No.: US 11,488,374 B1
(45) Date of Patent: Nov. 1, 2022

(54) MOTION TRAJECTORY TRACKING FOR ACTION DETECTION

(71) Applicant: Apple Inc., Cupertino, CA (US)

(72) Inventors: Wei Sun, San Jose, CA (US); Jun Hu, Sunnyvale, CA (US); Marius Tico, Mountain View, CA (US); Xuemei Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 195 days.

(21) Appl. No.: 16/578,825

(22) Filed: Sep. 23, 2019

Related U.S. Application Data (60) Provisional application No. 62/738,591, filed on Sep. 28, 2018.

(51) Int. Cl.
| | |
|---|---|
| *G06V 10/25* | (2022.01) |
| *G06V 10/20* | (2022.01) |
| *G06T 5/50* | (2006.01) |
| *G06T 7/20* | (2017.01) |
| *G06K 9/62* | (2022.01) |
| *G06V 10/26* | (2022.01) |
| *G06V 20/00* | (2022.01) |

(52) U.S. Cl.
CPC ......... *G06V 10/255* (2022.01); *G06K 9/6201* (2013.01); *G06T 5/50* (2013.01); *G06T 7/20* (2013.01); *G06V 10/273* (2022.01); *G06V 20/00* (2022.01)

(58) Field of Classification Search
None
See application file for complete search history.

(56) References Cited

U.S. PATENT DOCUMENTS

| | | | |
|---|---|---|---|
| 8,634,592 B2 | 1/2014 | Casamona | |
| 9,224,068 B1* | 12/2015 | Ranzato | G06K 9/6255 |
| 9,607,243 B1* | 3/2017 | Brualla | G06T 5/10 |
| 9,684,830 B2 | 6/2017 | Kim | |
| 2003/0023974 A1 | 1/2003 | Dagtas | |
| 2005/0288911 A1* | 12/2005 | Porikli | G06K 9/00335 703/2 |
| 2006/0078165 A1* | 4/2006 | Watanabe | G06T 7/248 382/107 |

(Continued)

OTHER PUBLICATIONS

Finding Trajectories of Feature Points in a Monocular Image Sequence. Sethi et al. (Year: 1987).*

(Continued)

*Primary Examiner* — Delomia L Gilliard (74) *Attorney, Agent, or Firm* — Blank Rome LLP

(57) ABSTRACT

The disclosure pertains to techniques for image processing. One such technique comprises a method for image selection, comprising obtaining a sequence of images, detecting one or more objects in one or more images of the sequence of images, determining a location for each detected object in the one or more images, determining a trajectory for each detected object based on a determined location for each respective detected object in two or more images of the sequence of images, determining a trajectory waypoint score for the trajectory of each detected object, determining a set of selected images based on an aggregation of trajectory waypoint scores for each detected object in each respective image, and outputting the set of selected images for presentation.

23 Claims, 10 Drawing Sheets

(56) References Cited

U.S. PATENT DOCUMENTS

| | | | | |
|---|---|---|---|---|
| 2007/0269139 A1* | 11/2007 | Erol | .................... | G06F 16/5838 |
| | | | | 707/E17.023 |
| 2008/0232687 A1* | 9/2008 | Petersohn | .............. | G06F 16/786 |
| | | | | 382/173 |
| 2011/0091073 A1* | 4/2011 | Iwasaki | .................... | G06T 7/215 |
| | | | | 382/103 |
| 2011/0255747 A1* | 10/2011 | Iwasaki | .................... | G06T 7/223 |
| | | | | 382/103 |
| 2012/0041672 A1* | 2/2012 | Curtis | .................... | H04H 20/91 |
| | | | | 701/426 |
| 2013/0101167 A1* | 4/2013 | Holeva | .................... | B66F 9/122 |
| | | | | 382/103 |
| 2013/0243252 A1* | 9/2013 | Xu | .................... | G06K 9/00369 |
| | | | | 382/103 |
| 2014/0192205 A1* | 7/2014 | Bahadirov | ................ | G06T 7/20 |
| | | | | 348/169 |
| 2014/0341474 A1* | 11/2014 | Dollar | ................ | G06K 9/00711 |
| | | | | 382/197 |
| 2015/0365591 A1* | 12/2015 | Aronsson | .................. | G06T 7/20 |
| | | | | 348/239 |
| 2016/0005281 A1* | 1/2016 | Laska | ................ | G08B 13/1961 |
| | | | | 348/143 |
| 2016/0267325 A1* | 9/2016 | Sundaresan | ........ | G06K 9/00624 |
| 2016/0323599 A1* | 11/2016 | Lu | ........................ | H04N 19/523 |
| 2017/0177937 A1* | 6/2017 | Harmsen | ................. | G06T 17/05 |
| 2017/0301109 A1* | 10/2017 | Chan | .......................... | G06T 7/73 |
| 2018/0137632 A1* | 5/2018 | Takada | ...................... | G06T 3/00 |
| 2019/0034794 A1* | 1/2019 | Ogale | ................ | G01C 21/3407 |
| 2019/0065895 A1* | 2/2019 | Wang | .................. | G06K 9/6201 |
| 2019/0258878 A1* | 8/2019 | Koivisto | .............. | G06N 3/0445 |
| 2019/0392268 A1* | 12/2019 | Tariq | ................. | G06K 9/00791 |
| 2020/0082248 A1* | 3/2020 | Villegas | ................ | G05D 1/0223 |
| 2020/0225669 A1* | 7/2020 | Silva | ................ | B60W 60/0015 |

OTHER PUBLICATIONS

Safe and Reliable Path Planning for the Autonomous Vehicle Verdino. Arnay et al. (Year: 2016).*

Yazdi, Mehran, and Thierry Bouwmans, "New Trends on Moving Object Detection in Video Images Captured by a moving Camera: A Survey," Mar. 6, 2018.

* cited by examiner

MOTION TRAJECTORY TRACKING FOR ACTION DETECTION

BACKGROUND

The subject matter disclosed herein relates to the field of digital imaging and, without limitation, techniques for improving motion trajectory tracking for action detection.

Digital imaging systems, such as video or still imaging cameras are capable of capturing a very large number of images in a relatively short period of time. Increasingly, cameras are capable of capturing tens or even hundreds of images a second. Image capturing may also occur prior to or after other user interactions. For example, images may be captured when a camera is active, but the capture button has not yet been pressed (or has just been released), in order to compensate for a user pressing the capture button too late (or too soon).

In many cases, users may only want to keep a single image or a relatively small subset of these images. Existing techniques for selecting images from an image sequence, such as a video clip or burst of images, include using face detection, expression detection, and/or motion detection. However, such techniques may not be best suited for action image sequences, in which a captured image sequence may include a series of images of an action scene with one or more objects in the scene that are in motion across the series of images. As an example, a user may capture an action image sequence of a person running and jumping. While each image from the action image sequence may show the person at a specific location in the image, the location of the person may change between the various images of the action image sequence. For such an action image sequence, the user may be less interested in an image of the person smiling (or sitting still) than an image of the action of person running or jumping. More specifically, the user may be interested in images which show a change in the action, such as a beginning, apex, change of direction, and/or landing of the jump, rather than images that simply reflect an object experiencing some form of motion.

SUMMARY

This disclosure relates generally to the field of image processing. More particularly, but not by way of limitation, aspects of the present disclosure relate to a computer-implemented method for image processing. The method comprises obtaining a sequence of images, detecting one or more objects in one or more images of the sequence of images, determining a location for each detected object in the one or more images, determining a trajectory for each detected object based on a determined location for each respective detected object in two or more images of the sequence of images, determining a trajectory waypoint score for the trajectory of each detected object, determining a set of selected images based on an aggregation of trajectory waypoint scores for each detected object in each respective image, and outputting the set of selected images for presentation.

DETAILED DESCRIPTION

This disclosure pertains to systems, methods, and computer readable media to improve the operation of digital imaging systems. More specifically, aspects of the present disclosure relate to improving motion trajectory tracking for action detection for selecting images of a set of images.

Generally, selecting images from an image sequence can be used both for post-capture processing and in processing images as they are being captured. In the post-capture case, image sequences may be captured by an imaging device, the resulting images processed, and images selected from the image sequence. These selected images may be presented to the user, used for indexing, to create summaries, thumbnails, slideshows, select favorite images from, etc., for the image sequence. In the case of processing images as they are being captured, image sequences may be processed to select images to be stored (e.g., images that would likely be of interest to a user) without requiring user interaction, such as by pressing a capture button.

For a particular image sequence, action or scene classifiers may further be used to determine that the image sequence is an action image sequence capturing an action scene, rather than, for example, a portrait image sequence or other non-action related image sequence. For an action image sequence, a user may be interested in key moments of the action, such as beginning a jump, at the apex of the jump, and landing the jump. In the case of a tennis serve, for another example, a user may be interested in just the beginning of the serve, the contact with the tennis ball, and the end of the server's follow-through. These key moments of action often occur when objects in the image appear to change directions. For example, a person beginning a jump from a run generally coincides with the person changing directions from a more or less horizontal direction to one with a larger vertical component. Similarly, the beginning of a tennis serve generally coincides with the tennis racket starting to move in the direction of the swing. Images taken during this change in direction are often less blurry, as well, as the change in direction generally coincides with lower relative motion as the object generally slows (or stops) in a first direction before accelerating in a second direction. For example, a ball making contact with tennis racket stops moving in a first direction at the point of contact and begins to accelerate in another direction. Thus, aspects of the present disclosure relate to techniques for using motion trajectory tracking to efficiently and accurately identify images of potential interest to a user from images sequences that are representative of action scenes.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the claimed subject matter, leaving resorting to the claims as a potential necessity to determine such claimed subject matter. Reference in this disclosure to "one embodiment" or to "an embodiment" or "embodiments" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of graphical processor interface software or graphical processing systems.

Generally, an action image sequence contains one or more moving objects that appear in at least two images of the action image sequence. Object detection is performed for each image of the action image sequence to detect the moving objects that are visible in the image and to track the objects across multiple images. These objects may be detected in the images via any known technique. For example, one or more objects may be detected using object segmentation techniques, which may detect the location of clumps of pixels which appear to move together across multiple images. By comparing at least two closely-related images, such as by aligning the images, pixels that appear to move together as between the at least two images may be detected and determined to be a moving object. In other examples, color histograms or machine learning object classifiers may be used to detect and locate objects in an image and the location of the objects tracked across multiple images.

Figure 1:
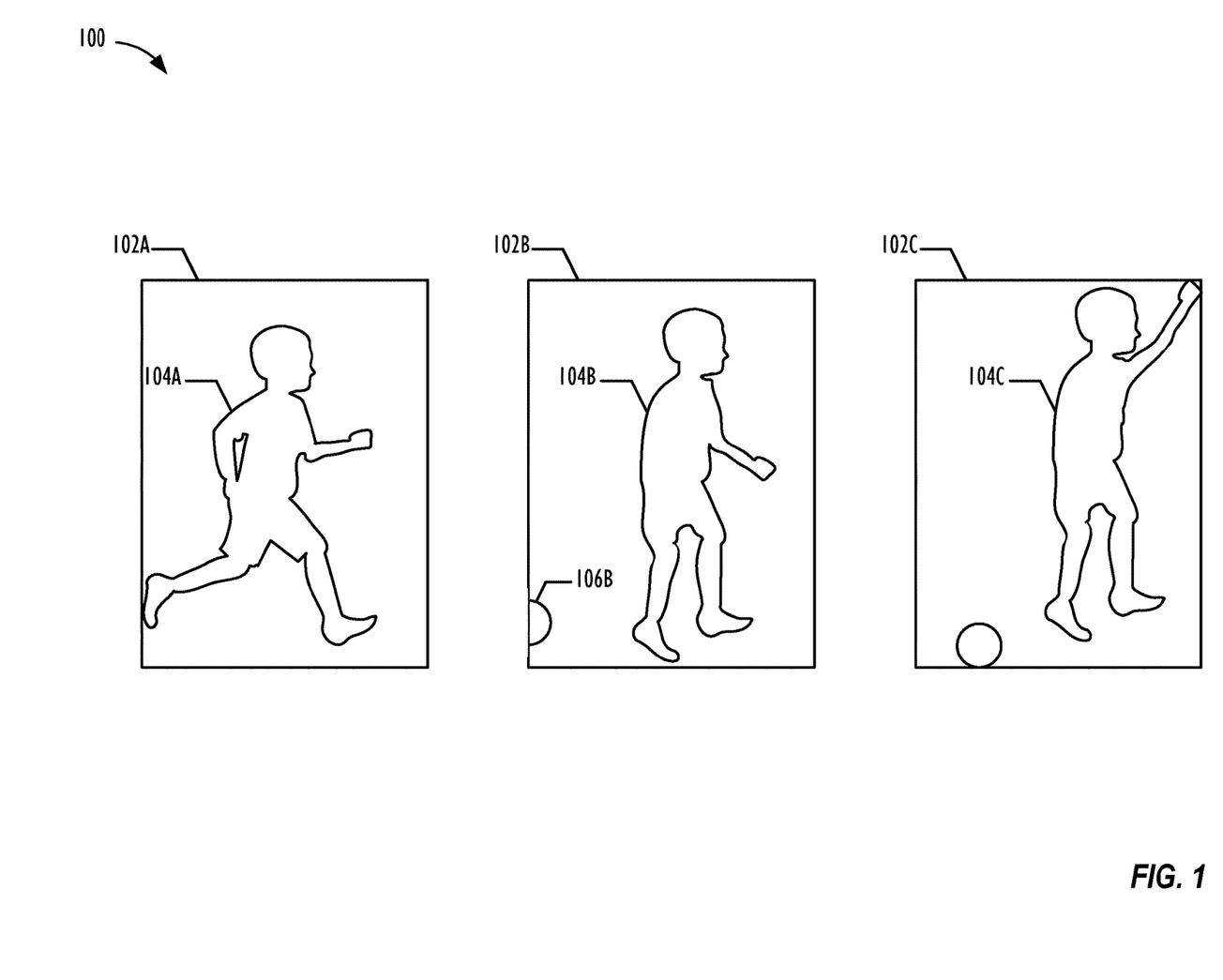
FIG. 1 illustrates example detected objects in images from an action image sequence, in accordance with aspects of the present disclosure.

Referring now to FIG. 1, which illustrates example detected objects images 100 from an action image sequence, in accordance with aspects of the present disclosure. Detected objects image 102A illustrates the moving objects, such an object area 104A, describing a person, which were detected in a corresponding image of an action image sequence. Certain object detection techniques may detect many more objects, such as objects in the background, than just the object area 104A, as certain object detection techniques may be capable of additional features, such recognizing objects or detecting objects that are not moving. However, for purposes of trajectory tracking, objects which do not appear to move or exhibit small amounts of movement below a threshold may be ignored. In this example, the background does not exhibit any motion, and thus is effectively removed from the trajectory tracking process. In some embodiments, object recognition may be leveraged to provide further information such as the likely speed or direction in which a detected object may move.

Detected objects may be added to an inventory of detected objects. The inventory contains information describing the detected objects as well the detected object's corresponding trajectory over time. This helps track detected objects across multiple images, such as, with respect to object area 104A, for object area 104B in image 102B and object area 104C in image 102C. As detected objects are tracked from one frame to another, their trajectories may also be updated, for example, after each frame. The inventory may be, for example, a data structure in data storage, such as in a memory, hard disk, database instance, or other form of data storage.

Often, detected objects may appear in less than all images in a captured image sequence. As examples, objects may split into multiple objects, such as where a person throws a ball, or objects may enter a scene. As shown in image 102B, an object area 106B, representing a ball, makes its first appearance in image 102B. Once a potentially new candidate object is detected, the candidate object is matched against the inventory of previously detected objects and corresponding information describing the previously detected objects to check if the candidate object has been previously detected. For example, a change in lighting, rotation of the object, deformation of the object, etc. may change aspects about the object. In certain cases, this matching may take into account an expected or predicted location for a detected object based on a previously determined trajectory for the previously detected object. If the candidate object matches against a previously detected object in the inventory, then the inventory item for the previously detected object may be updated. If the candidate object does not match against a previously detected object, then the candidate object and any information corresponding to the candidate object may be added to the inventory as a new object.

Figure 2:
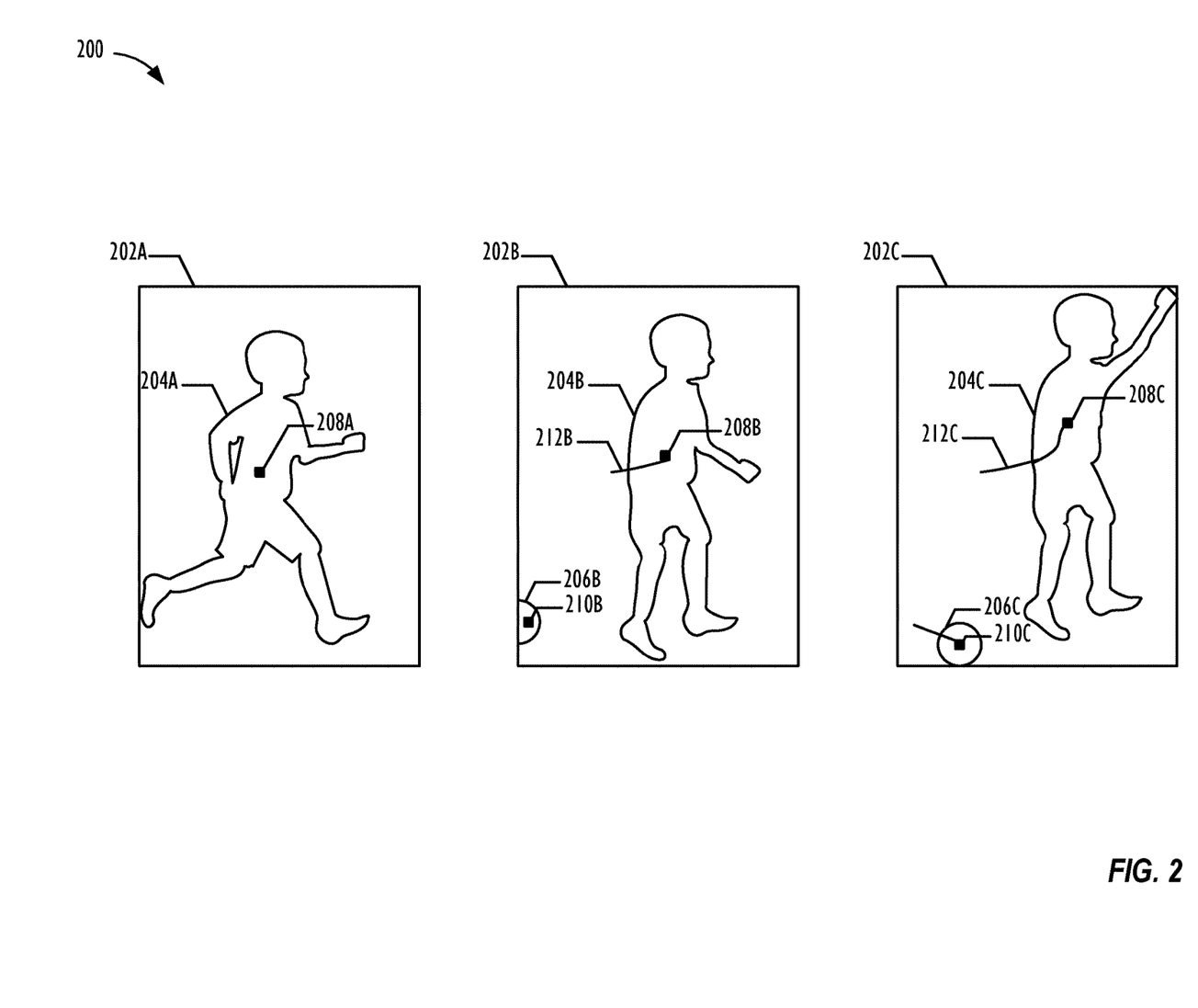
FIG. 2 illustrates example trajectories for images from an action image sequence, in accordance with aspects of the present disclosure.

FIG. 2 illustrates example trajectories for images 200 from an action image sequence, in accordance with aspects of the present disclosure. For one or more of the detected objects in an image, a location for the detected object may be determined. According to certain aspects, this location may correspond to the location of a center mass of the detected object. Center mass of the detected object may be determined using a variety of techniques. These techniques include, but are not limited to, drawing a bounding box around the detected object and then finding the center of the bounding box, drawing a contour around the detected object and finding the center of the contour, or averaging the location of all the pixels associated with the detected object. The center mass of the detected object can be used as a waypoint (i.e., a representative location of the detected object in a given image of the action image sequence) for determining a trajectory of the detected object. Here, the location of the center mass of the object area 204A, 204B, and 204C may be used as a trajectory waypoint 208A, 208B, and 208C, respectively. Similarly, object areas 206B and 206C are associated with location waypoints 210B and 210C, respectively. Where center mass is used to determine a waypoint, changes in a perceived size of the detected object, such as through rotation, lighting, change in depth of the detected object in the scene, etc., can introduce noise into calculating the center mass of the detected object, but generally this noise does not substantially alter the overall trajectory of the detected object.

The trajectory for the detected object of an image may be tracked across two or more images of the sequence of images. Using the waypoints of the detected objects as locations, a trajectory for the corresponding detected object can be determined. After waypoints for the detected object are determined, a trajectory 212B and 212C can be defined by linking the waypoints. Tracking a trajectory of a detected object over time, e.g., across a captured image sequence, allows the trajectory to be built up for each successive captured image in which the detected object continues to be identified. For example, trajectory 212C for object area 204C may build upon information related to a previous trajectory 212B for object area 204B from previous image 202B. That is, after image 202C is captured and object 204C identified to be object 204B in previous image 202B, previous trajectory 212B may be updated to trajectory 212C. Information related to tracked trajectories may be stored in a trajectory tracking inventory, which may be separate from, or integrated with the inventory of detected objects.

In certain cases, a maximum number of trajectories that may be tracked across an action sequence may be defined. Generally, the maximum number of trajectories that may be tracked may be set high enough to account for the tracking of all motion that is expected to be of potential interest in an action image sequence, but low enough to stay within performance or memory constraints of a device(s) implementing the trajectory tracking techniques. For example, in a complex action scene, such as a football game, users may be interested in the players and the ball, but are unlikely to be interested in dirt being kicked up on the field or the movement of each individual spectator in the stands. In certain cases, the maximum number of tracked trajectories may be adjusted based on, for example, an amount of time the action image sequence covers, processing power, battery life, memory available, etc. According to certain aspects, this adjustment may be dynamic, for example, allowing the maximum number of tracked trajectories to be increased after a particular recording has exceeded a certain time threshold. In some embodiments, while a maximum number of tracked trajectories may be defined, a number of detected objects may be unlimited—and determining which of the detected object's associated trajectories to track may be based on one or more statistics calculated on the trajectories.

Figure 3:
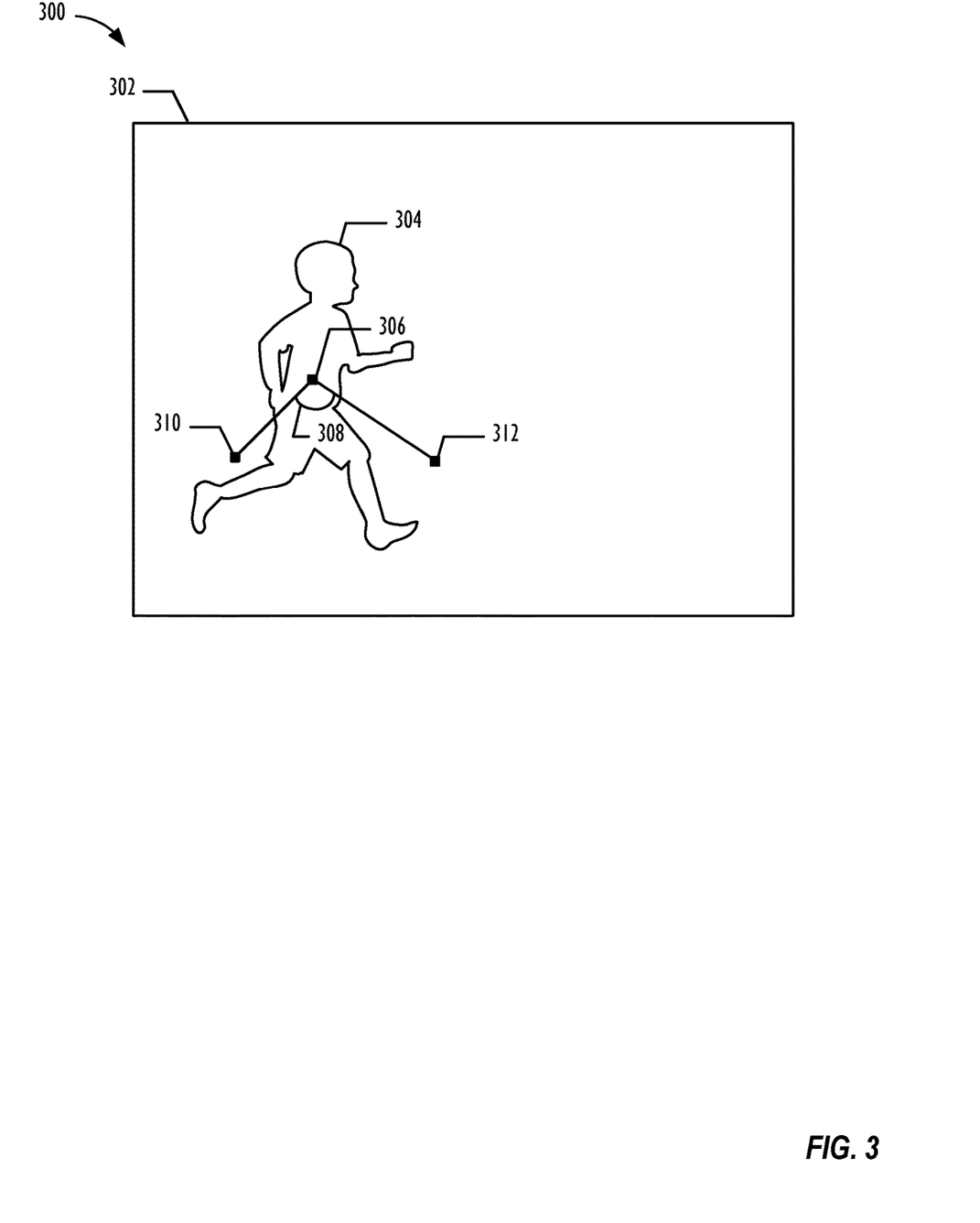
FIG. 3 illustrates example local trajectory statistics, in accordance with aspects of the present disclosure.

Trajectory statistics may be determined based on information from a single image, as well as across multiple images from the action image sequence. Generally, trajectory statistics determined from approximately one to three images may be referred to as "local" trajectory statistics, and trajectory statistics calculated across an object's entire trajectory (or substantially all of an object's entire trajectory) may be referred to as "global" trajectory statistics. FIG. 3 illustrates example local trajectory statistics 300, in accordance with aspects of the present disclosure. Here, image 302 may be designated as the $i^{th}$ image of an action image sequence. Local trajectory statistics that may be determined include, but are not limited to, object area 304, an object trajectory waypoint 306, local motion angle 308, and object tracking confidence score. As discussed above, the object trajectory waypoint 306 may be determined for one or more detected objects in the image 302, and the object trajectory waypoint 306 may be expressed for the $i^{th}$ image along a $j^{th}$ trajectory as $P_{ij}$. The object trajectory waypoint 306 may, in some cases, comprise the center of the object area 304. In certain cases, the object trajectory waypoint 306 may be the center mass of the detected object. The object area 304 indicates the size of the region, for example in pixels, that the detected object occupies in the image.

Local trajectory statistics may be determined for detected objects whether associated with a tracked trajectory or not. Generally, the object trajectory waypoint 306 and object area 304 may be calculated for a detected object regardless of whether the detected object is associated with a tracked trajectory. Local motion angle 308 indicates an angular change in the trajectory at a given image (in this case, the $i^{th}$ image) and is calculated based on a previous object trajectory waypoint 310 and a next object trajectory waypoint 312. The local motion angle 308 may be expressed as $\theta_{ij}$. In certain cases, $\theta_{ij}$ may be between 0 and 180, where values closer to 0 indicate a larger motion angle (e.g., more rugged trajectory) and values closer to 180 indicate a smaller motion angle (e.g., smoother trajectory).

The tracking confidence score for an object may indicate a level of confidence that the detected object is an actual object that has been properly tracked over multiple images, rather than, for example, transient noise. The tracking confidence score for a detected object may be assigned a default value when the detected object is first detected. If the detected object is successfully detected in a subsequent image, then the tracking confidence score for the detected object is increased. If the detected object is not successfully detected in the subsequent image, then the tracking confidence score for the detected object is decreased. This helps reduce the impact of noise, object detection errors, transient objects, etc., by reducing the confidence level over time, while recognizing that detected objects can appear and disappear throughout an action image sequence, such as where a detected object may be occluded and then becomes visible again, stops moving and starts moving again, etc. In those later cases, redetecting the detected object provides increased confidence that the detected object is not transient or due to noise. In certain cases, a rate at which the tracking confidence score is decreased when the detected object is not detected may be slower than the rate at which the tracking confidence score is increased when the detected object is detected, when all else is equal. In certain cases, the rate at which the tracking confidence score is increased is determined based on how closely the detected object in the current images matches with the detected object in the previous image. For example, the closer a color or size of the detected object in the current image matches with the color or size of the detected object in a previous image, the more the tracking confidence score may be raised.

The object tracking confidence score may be subject to a lower threshold in certain cases. When a tracking confidence score associated with an object falls below the lower threshold, the object may be considered invalid and its trajectory may be considered finished. Tracking may or may not be ceased for finished trajectories. For example, where the number of tracked trajectories are below the maximum number of tracked trajectories, trajectories that are considered finished may be left in the trajectory tracking inventory as the detected object associated with the trajectory may reappear in later images. If new trajectories being added to the tracking inventory result in the number of tracked trajectories exceeding the maximum number of tracked trajectories, trajectories may be removed from the tracking inventory based on some metrics as described below (or, assuming the maximum number of tracked trajectories is exceeded by a number, n, then the n trajectories may be removed from the tracking inventory based on some metrics as described below).

Figure 4:
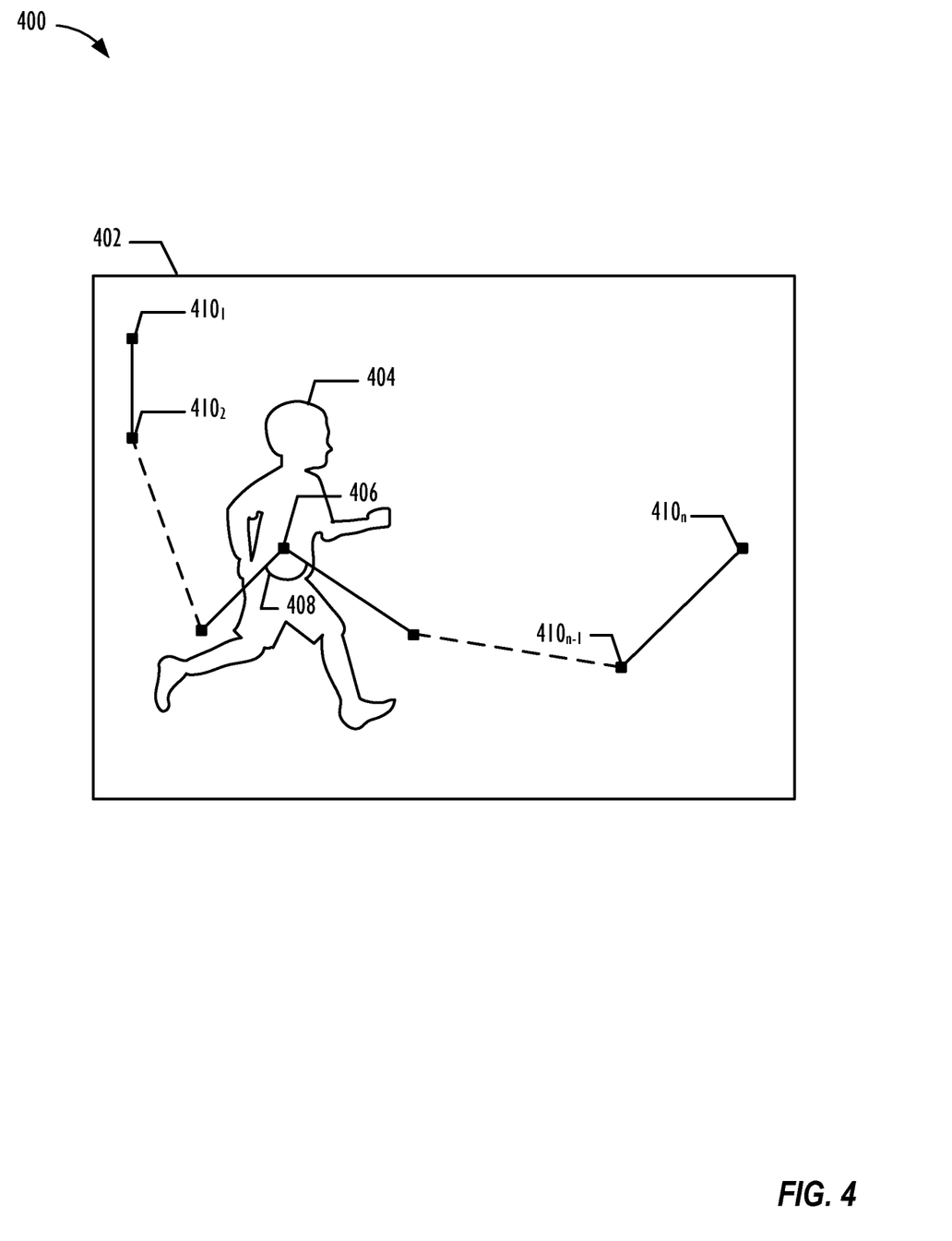
FIG. 4 illustrates example global trajectory statistics, in accordance with aspects of the present disclosure.

Global trajectory statistics for the trajectory of the detected object may be determined based on the local trajectory statistics collected from the images in which the detected object was detected. FIG. 4 illustrates example global trajectory statistics 400, in accordance with aspects of the present disclosure. Image 402 is the $i^{th}$ image of an action image sequence and includes object area 404, which represents a detected object on a $j^{th}$ tracked trajectory, with a local trajectory waypoint 406 and having a local motion angle 408. Global trajectory statistics may be determined over the entire trajectory for the detected object. The entire trajectory may include a total n number of trajectory waypoints $410_1$-$410_n$. A trajectory length may be determined by summing lengths between the n trajectory waypoints $410_1$-$410_n$ making up the $j^{th}$ tracked trajectory. An average motion angle (e.g., smoothness error) may be determined by dividing the sum of motion angles for each trajectory waypoint $410_1$-$410_n$ of the trajectory by n−2, as the first and last trajectory waypoints $410_1$, $410_n$ may not have an associated motion angle. Similarly, a trajectory tracking confidence can be defined as an average tracking confidence score of the object at n waypoints, which may be determined by dividing the sum of the object tracking confidence scores at n waypoints by n.

According to certain aspects, tracked trajectories can be sorted. Sorting may be performed based on a number of tracked trajectories, for example, when the number of tracked trajectories would exceed the maximum number of tracked trajectories, then the tracked trajectories may be sorted by certain metrics, such as trajectory tracking confidence scores, trajectory lengths, and average motion angle of the trajectories. Trajectories with the lowest values according to the metrics may be removed until a total number of tracked trajectories is less than or equal to the maximum number of tracked trajectories. In other cases, the sorting of tracked trajectories can be performed for each image, every other image, when a new tracked trajectory is added, etc. In certain cases, sorting may be based on trajectory tracking confidence scores, where higher tracking confidence scores are preferred. If multiple trajectories have the same trajectory tracking confidence, then those trajectories may be sorted based on the trajectory length of those trajectories, where trajectories having a longer trajectory length are preferred. If multiple trajectories have the same trajectory tracking confidence and trajectory lengths, then those trajectories may be sorted based on the average motion angle of the trajectories, where smoother trajectories are preferred.

For each trajectory waypoint of an image, a trajectory waypoint score may be determined. The trajectory waypoint score may be determined based on a number of factors, including, but not limited to the total number, n, of trajectory waypoints in the given trajectory, the detected object's area at the waypoint, the motion angle at the waypoint, and how close the trajectory waypoint is to the center of the image. In certain cases, a higher total number of trajectory waypoints, an increased object area, a smoother motion angle, and being closer to the center of the image correlate with a higher trajectory waypoint score. The trajectory waypoint score may take into consideration other factors as well, such as one or more normalization factors (e.g., based on the size of the image).

Figure 5:
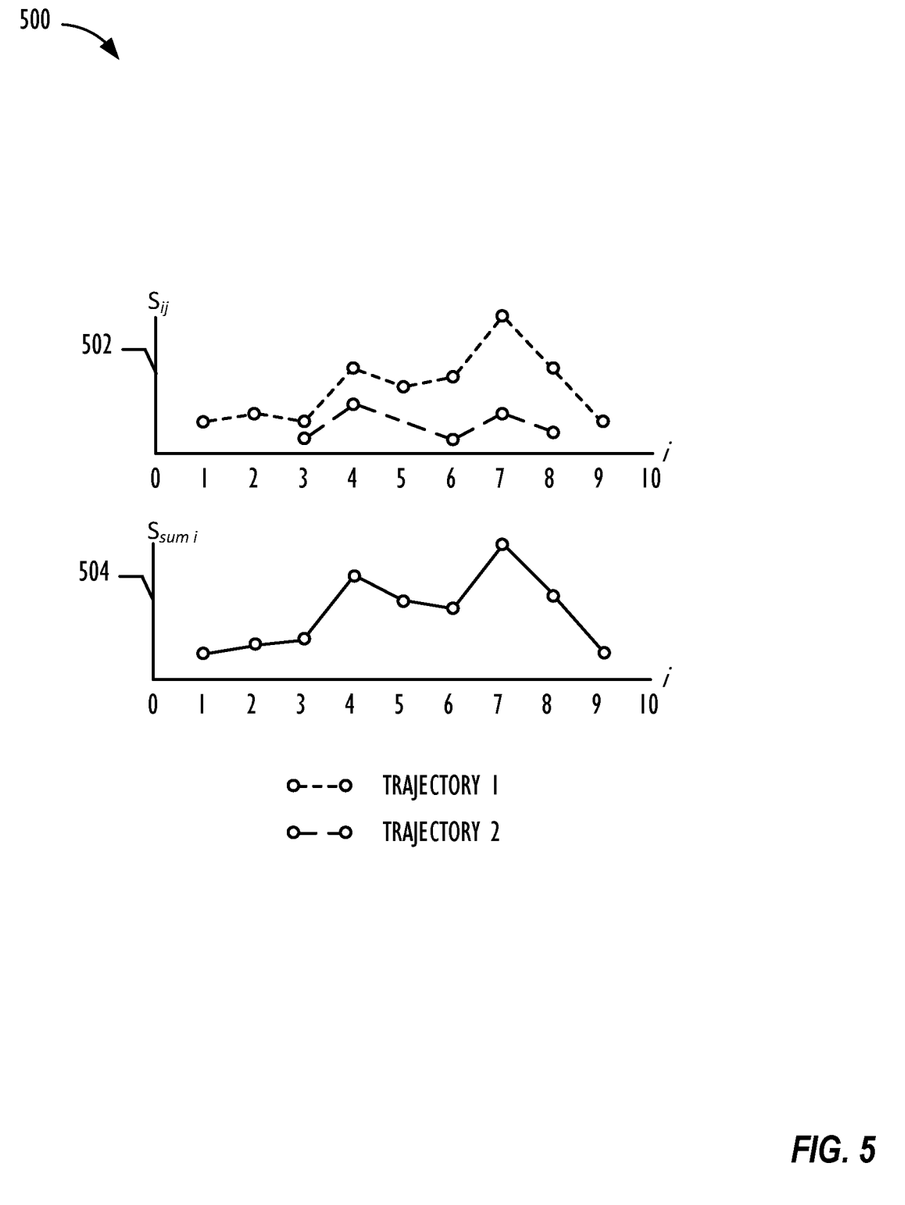
FIG. 5 illustrates an example technique for trajectory score aggregation, in accordance with aspects of the present disclosure.

Once per-trajectory waypoint scores are determined for an image, the trajectory waypoint scores may be aggregated. FIG. 5 illustrates an example technique for trajectory score aggregation 500, in accordance with aspects of the present disclosure. Trajectory waypoint scores may be aggregated using sum aggregation, which sums the trajectory waypoint scores for each trajectory in an image. Graph 502 plots the trajectory waypoint scores $S_{ij}$, for two trajectories, on the y axis for each image i in the image sequence, ascending in numerical order across the x-axis. The trajectory waypoint scores for the trajectories in each image are then summed, as shown in graph 504. In this example, for images i=1, 2, and 9, as there is only a single trajectory, trajectory 1, in those images, the sum trajectory score for those images are equal to the trajectory waypoint score of trajectory 1. For the other images, the trajectory waypoint score for trajectory 1 are added to the trajectory waypoint score for trajectory 2 to obtain the sum trajectory score for that respective image and plotted in graph 504.

Once the sum trajectory scores for the images of the action image sequence have been obtained, a set of candidate images may be selected. According to certain aspects, images may be sorted in order of their associated sum trajectory scores, and the images with the highest sum trajectory scores chosen as an initial set of images such that a difference in a score made by adding the sum trajectory score of one more image is less than a threshold amount. In other embodiments, a predetermined or varying number of trajectories may be selected. Images from among the initial set of images that are too similar to one another may then be removed (e.g., because only one such image would be needed to sufficiently represent that particular part of the action sequence).

As a part of removing similar images, the chosen images may be arranged in temporal order, and a similarity error between every pair of neighboring images may be determined. The similarity error may, e.g., be calculated based on a horizontal and vertical signature determined for each of the chosen images in each color channel, such as in each of the YUV or RBG color channels. Horizontal and vertical signatures for an image are compared to horizontal and vertical signatures for neighboring images to determine a horizontal and vertical similarity error. The similarity error is then a sum of the horizontal and vertical similarity error. Neighboring images that are the most similar, such as by having the lowest similarity error, are identified, and one image of the neighboring similar images can be removed from the set of selected images. The image having a lower sum trajectory score of the neighboring images can be removed. Similarity errors as between neighboring images may then be updated and the process repeated until a threshold or desired number of candidate images remain.

In certain cases, the threshold number of candidate images may also be defined, based on, for example, a fixed number of images, the highest sum trajectory score, the length of the action image sequence, total number of trajectories, a percentage of the images, user interface limitations, etc.

Generally, obtaining candidate images based on the sum trajectory score may tend to obtain candidate images with a relatively large amount of motion overall, e.g., a large number of moving objects. Where an image includes, for example, many moving objects moving along their respective trajectories and a single object experiencing a large directional change, the significance of the motion angle change of the single object may be overshadowed or masked out, depending on an aggregation or sorting method used, by the many moving objects (which may, e.g., be smaller objects, objects in the periphery of the image, or objects traveling in a similar direction for a number of consecutive frames). To help account for such cases, other techniques for aggregating the trajectory scores may be used in conjunction with, or instead of, trajectory score sum aggregation, such as techniques that take into account the frames in which an object is experiencing a peak motion angle (also referred to herein as, "peak motion angle aggregation" techniques).

Figure 6:
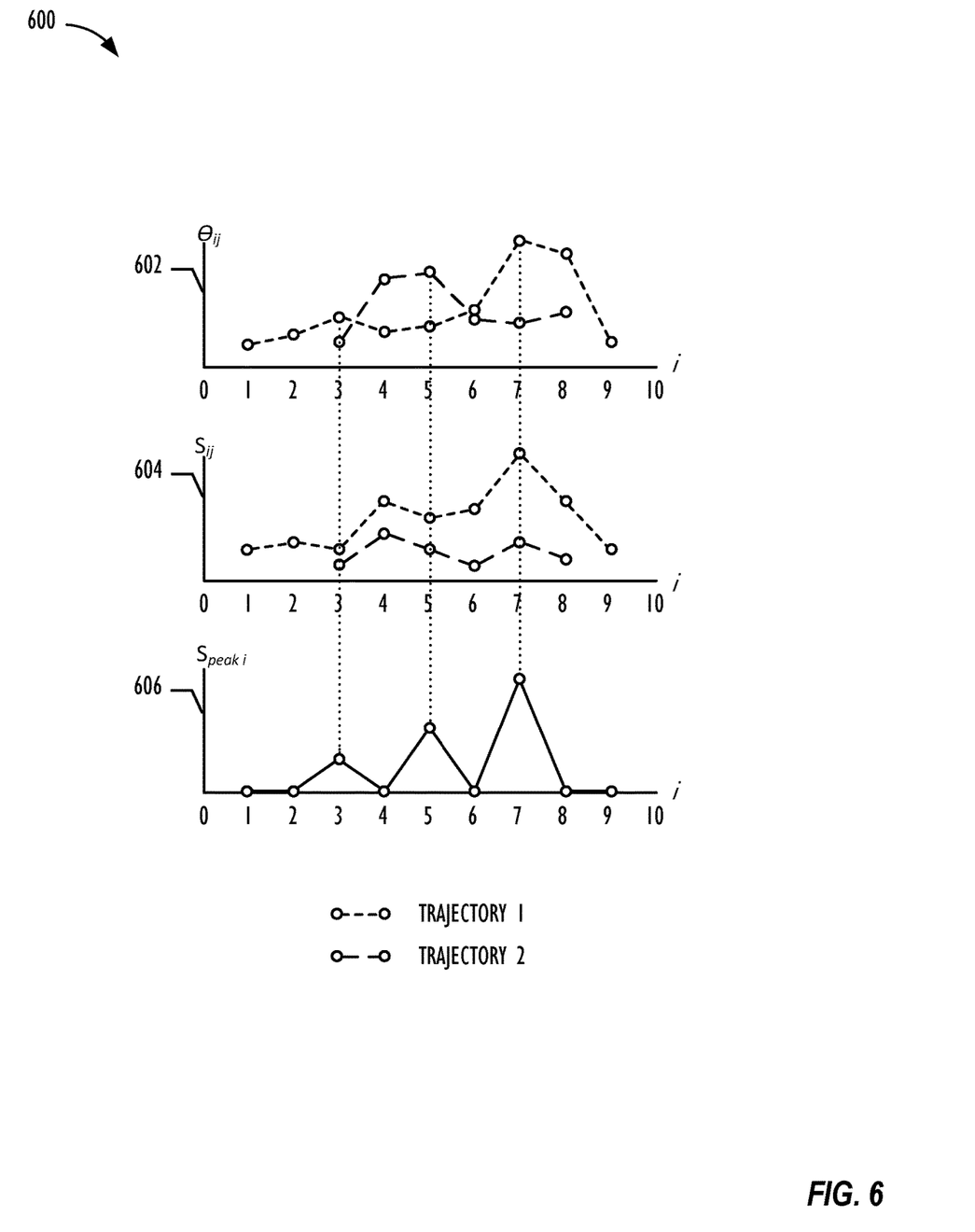
FIG. 6 illustrates an example technique for trajectory score aggregation, in accordance with aspects of the present disclosure.

FIG. 6 illustrates an example technique for trajectory score aggregation 600, in accordance with aspects of the present disclosure. Graphs 602, 604, and 606 of FIG. 6 illustrate trajectory score aggregation via peak motion angle aggregation. Graph 602 plots the motion angle $\theta_{ij}$, for two tracked trajectories, on the y axis for each image i in the image sequence, ascending in numerical order across the x-axis. Local maximum motion angles are then found for each tracked trajectory. For example, in graph 602, trajectory 1 includes local maximum motion angles at images 3 and 7, and trajectory 2 includes a local maximum motion angle at image 5. In certain cases, local maximums may be determined by comparing, for a trajectory j of image i, a motion angle of a trajectory waypoint $\theta_{ij}$ to the motion angle of a previous trajectory waypoint $\theta_{i-1,j}$ and the motion angle of a next trajectory waypoint $\theta_{i+1,j}$ to see if the motion angle of the trajectory waypoint $\theta_{ij}$ is greater than both the motion angle of the previous trajectory waypoint and the motion angle of the next trajectory waypoint. For the images associated with local maxima, the trajectory waypoint scores of the corresponding trajectories exhibiting local maxima for those images are found. Graph 606 plots the trajectory waypoint scores of trajectory 1 for images 3 and 7 and the trajectory waypoint score of trajectory 2 for image 5, while the other images not having a local motion angle are zeroed.

An additional set of candidate images (i.e., in addition to those suggested by graph 504 of FIG. 5) may be selected from the images having local maximum motion angles (as shown in graph 606 of FIG. 6). In cases where multiple sets of candidate images are obtained, similar images may be removed from each set of candidate images. According to some embodiments, for an action image sequence, a first set of candidate images may be found, for example, using a sum aggregation technique, and similar images may be removed from the first set of candidate images. A second set of candidate images may be found, for example, using peak motion angle aggregation, and similar images may be removed from the second set of candidate images if desired, as well.

While two example techniques for aggregating trajectory waypoint scores are provided, it may be understood that many other techniques are possible. Where multiple techniques for aggregating trajectory waypoint scores are used and multiple sets of candidate images are produced, a final set of images may be selected from among the multiple sets of candidate images. For example, initially, the multiple sets of candidate images identified by the multiple techniques may be merged together, and the merged candidate images may be sorted in temporal order. If there are any duplicate images selected by the multiple techniques, the duplicate images may be discarded until only one image of the duplicate images remain. For example, if multiple sets of candidate images include image 7, discard one of the duplicate image 7's until there is only one image 7 remaining in the merged set of candidate images.

If images selected by different techniques are adjacent in time to one another, they may next be evaluated for an image quality metric, e.g., sharpness and/or focus. If one image of the identified adjacent images is less sharp or not as well focused, then that one image may be discarded in favor of the other adjacent image. If adjacent images are similar in sharpness and focus, then one image of the identified adjacent images may be substituted for the other image, and a similarity error between the substituted image and a neighboring image of the other image may be determined. If the similarity error from comparing the substituted image and the neighboring image is more than the similarity error as between the other image and the neighboring image, the other image may be discarded. If there is no difference in similarity errors, then both images are kept. The remaining candidate images are then sorted based on the sum trajectory scores, and a target number of final selected images are selected based on their respective sum trajectory scores.

In certain cases, the target number of number of final selected images may be defined, based on, for example, a fixed number of images, the highest sum trajectory score, the length of the action image sequence, total number of trajectories, a percentage of the images, user interface limitations, etc.

Where a single technique for aggregating trajectory waypoint scores is used, the set of number of final selected images produced by the technique may comprise the final set of images.

Figure 7:
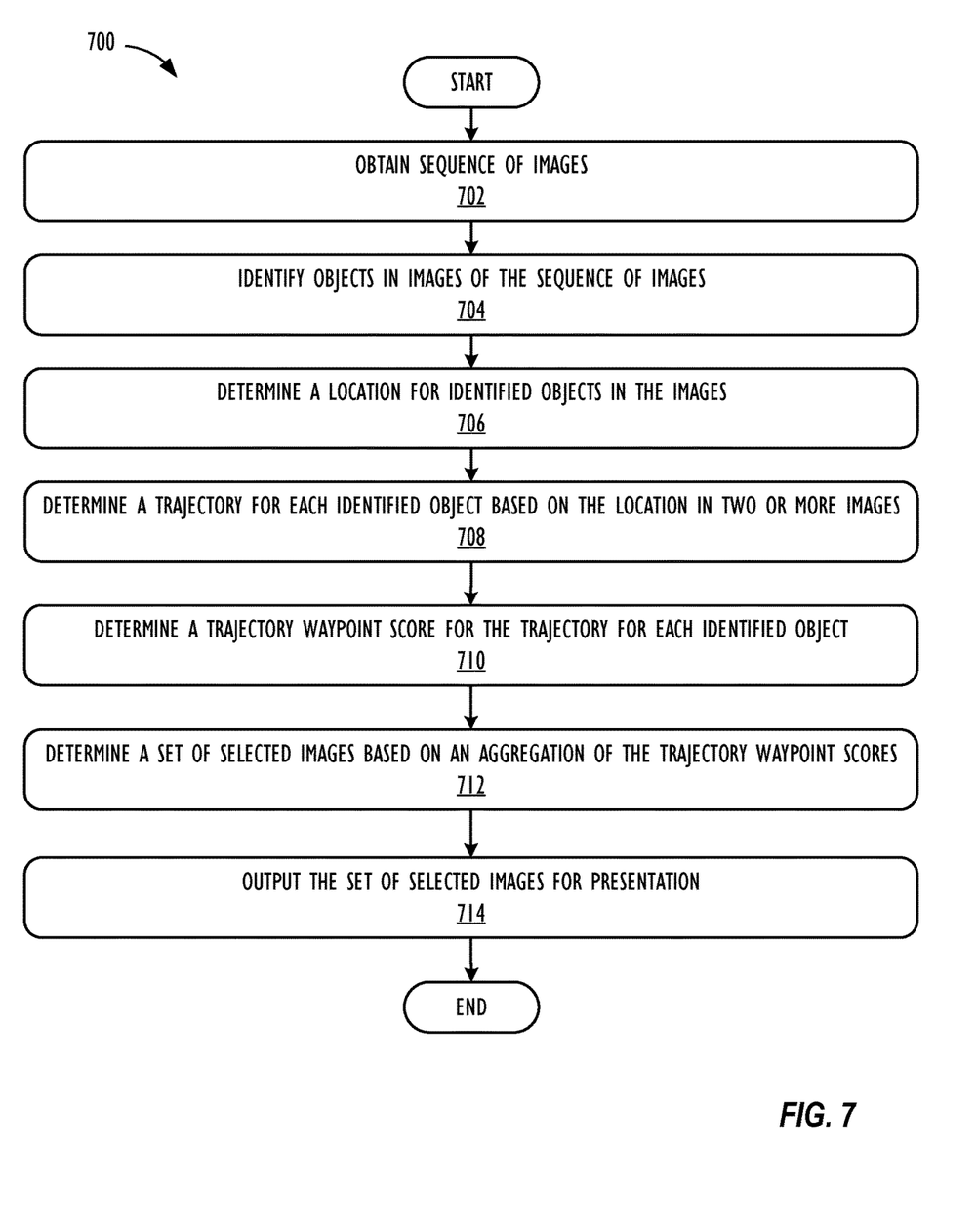
FIG. 7 is flow diagram illustrating a technique for selecting images, by a processor, in accordance with aspects of the present disclosure.

FIG. 7 is a flow diagram illustrating a technique 700 for selecting images, by a processor, in accordance with aspects of the present disclosure. At step 702, the technique proceeds by first obtaining a sequence of images. Generally, this sequence of images may be obtained from an imaging device in the form of a burst of still images, video, slow-motion images, etc. The images in the sequence of images generally are, initially, temporally sequenced. At step 704, the technique proceeds by detecting one or more objects in one or more images of the sequence of images. Objects may be detected using, for example, object segmentation, image alignment, machine learning classifiers, or other object detection technique. At step 706, the technique determines a location for each detected object in the one or more images. The location for each detected object may be determined based on a center of an object. The center of an object may, in certain implementations, be based on a center mass of the detected objects. The determined location can be used as a trajectory waypoint for constructing a trajectory. At step 708, the technique continues by determining a trajectory for each detected object based on a determined location for each respective detected object in two or more images of the sequence of images. The trajectory waypoints associated with a particular detected object define a trajectory for the particular detected object.

At step 710, the technique proceeds by determining trajectory waypoint scores for the trajectory of each detected object. The trajectory waypoint scores for a trajectory associated with a particular detected object may be determined based on a number of factors and statistics calculated based on particular images or across multiple images where the detected object was detected in. At step 712, the technique continues by determining a set of selected images based on an aggregation of the trajectory waypoint scores for each detected object in each respective image. Trajectory waypoint scores may be aggregated for the detected objects in a particular image of the sequence of images according to one or more implementations. These implementations include, but are not limited to sum aggregation and peak motion angle aggregation to select candidate images. Where multiple implementations of trajectory score aggregation are used, candidate scores for the multiple implementations may be combined and then images removed based on criteria, such as duplicates, sharpness, focus, etc., to obtain a final set of selected images. At step 714, the technique continues by outputting the set of selected images for presentation.

Figure 8A:
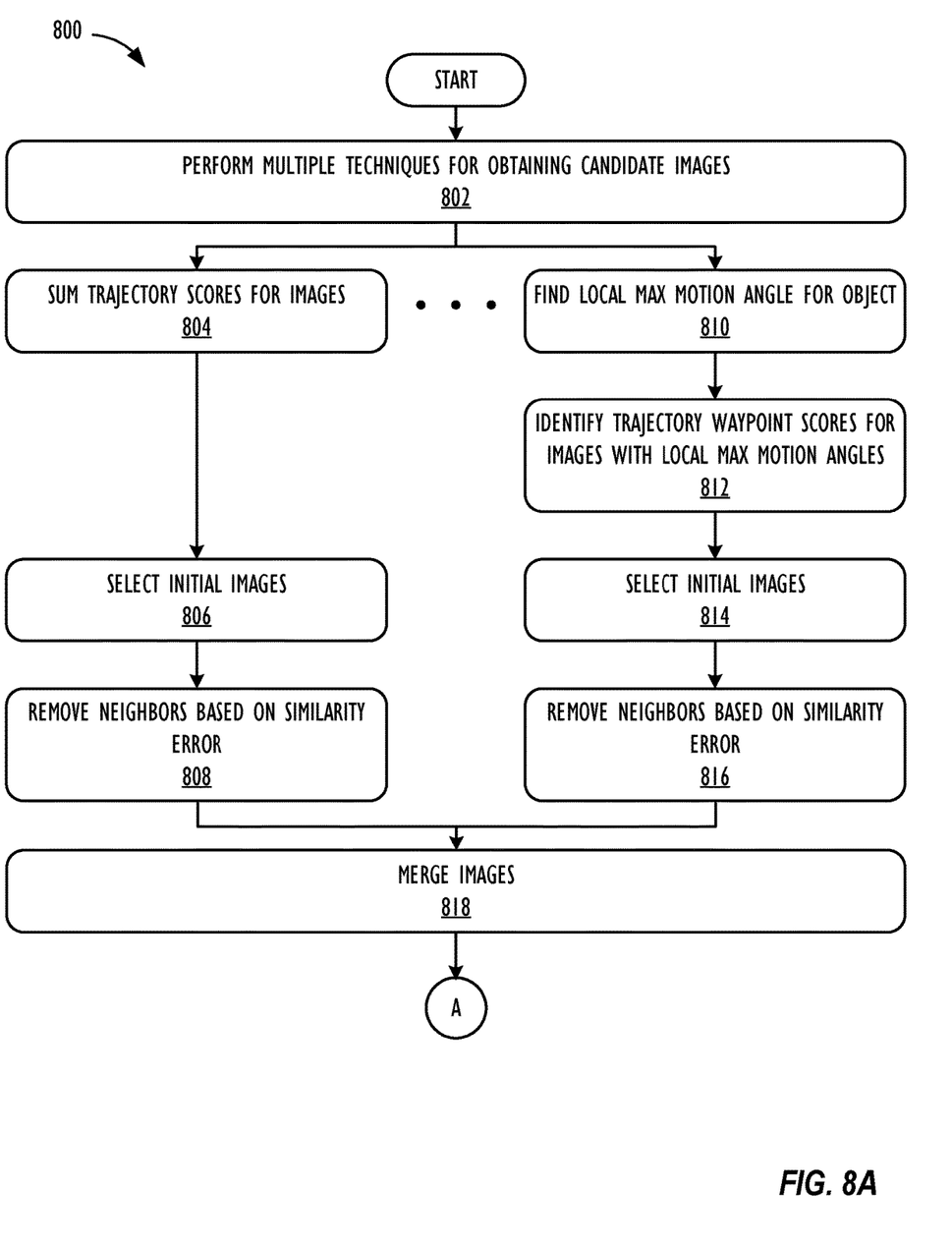
FIGS. 8A-8B show a flow diagram illustrating a technique for obtaining a set of images using multiple trajectory score aggregation techniques, in accordance with aspects of the current disclosure.
Figure 8B:
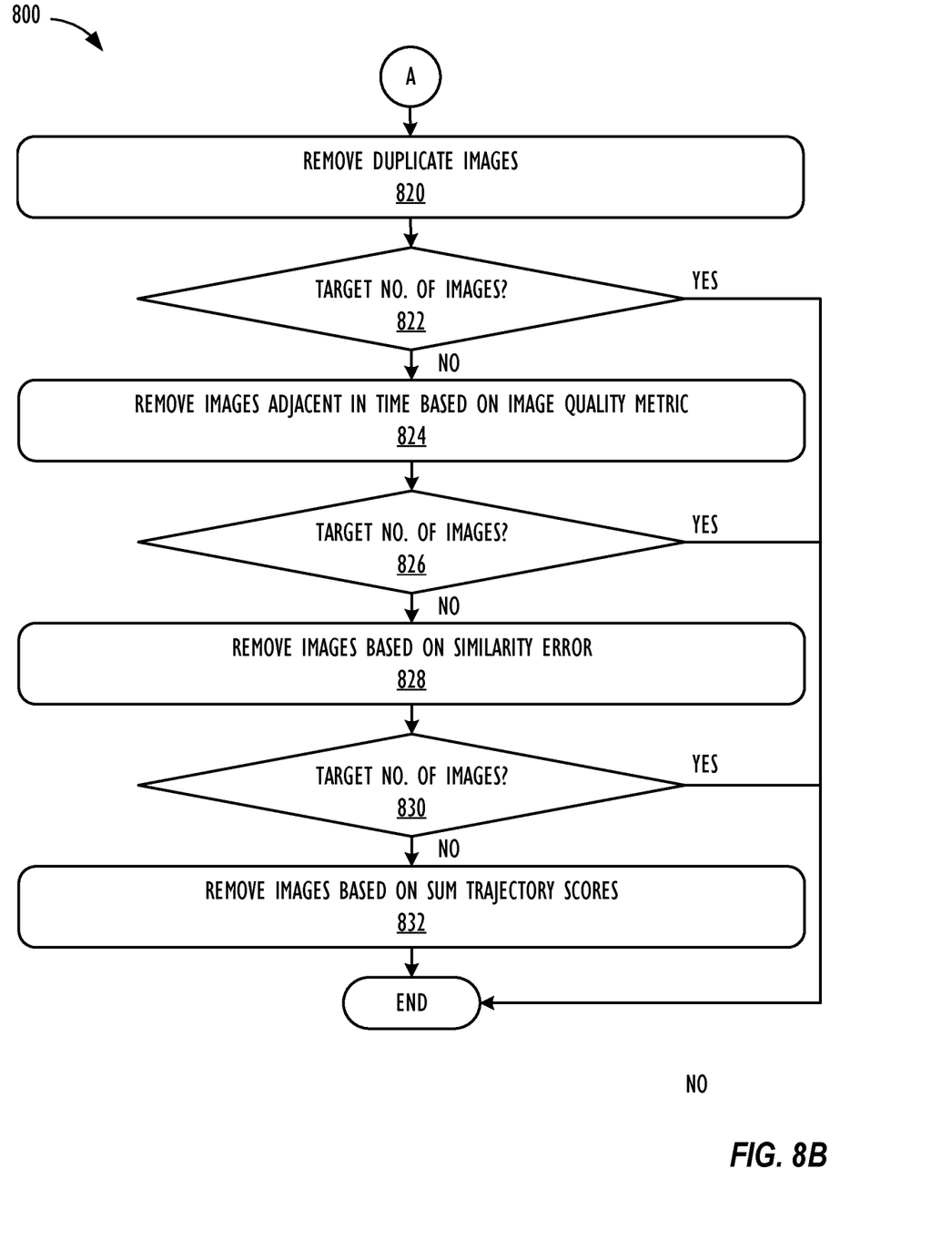

FIGS. 8A-8B show a flow diagram illustrating a technique 800 for obtaining a set of images using multiple trajectory score aggregation techniques, in accordance with aspects of the current disclosure. For implementations using multiple techniques for trajectory score aggregation to generate a final set of selected images for presentation, as shown at step 802, the multiple techniques may be performed substantially sequentially, or in parallel, as shown in the example of FIG. 8A. While this example illustrates using two particular trajectory score aggregation techniques, i.e., sum aggregation (804) and peak motion angle aggregation (810), it may be understood that other trajectory score aggregation techniques may be used in place of, or in addition to the two example techniques discussed.

Sum aggregation, starting at step 804, sums the trajectory waypoint scores for the trajectories in each image to generate a sum trajectory score for each image. At step 806, images are selected for the initial set of images, e.g., favoring images with a higher sum trajectory score. At step 808, images, from among neighboring images and from the selected images, may be removed based on a calculated similarity error between the neighboring images, to obtain a candidate set of images for technique 804 (i.e., the output of step 808). In certain cases, the neighboring image having the lower sum trajectory score may be removed.

For the peak motion angle aggregation technique, illustrated at step 810, local maximum motion angles are found for each tracked trajectory. Images associated with the local maximum motion angles are identified and a trajectory waypoint score is identified for the identified images at step 812. At step 814, an initial set of images are selected in a manner similar to that described in conjunction with step 806. At step 816, images from among neighboring images may be removed in a manner similar to that described in conjunction with step 808, resulting in a distinct set of candidate images for technique 810 (i.e., the output of step 816).

At step 818, the candidate sets of images obtained, in this example, from sum aggregation (i.e., the output of step 808) and peak motion angle aggregation (i.e., the output of step 816), may be merged together into a single set of candidate images. At step 820 in FIG. 8B, duplicate images are removed. Because multiple techniques for trajectory score aggregation may be used, a single image may be selected via multiple techniques, and these duplicate images will be redundant.

If, at step 822, the number of selected images from step 820 is more than the target number of images, at step 824, for implementations where multiple techniques for trajectory score aggregation are used, images that are adjacent in time may be evaluated based on image quality metrics, such as sharpness, focus, exposure, etc., and the image identified from the technique that is evaluated better via the image quality metrics may be kept. The adjacent, lower quality, image may be discarded. If, at step 826, the number of selected images from step 824 is more than the target number of images, at step 828, the most similar neighboring images, e.g., determined based on similarity errors calculated as between neighboring images, may be removed from the set of merged candidate images. If, at step 830, the number of selected images from step 828 is more than the target number of images, at step 832, more images may be removed, e.g., based on a sum trajectory score of the image. Steps 832 may select a target number of images with the highest sum trajectory scores. This target number of images may be equal to or, in some embodiments, different than the number of images selected as candidate images by any of the individual techniques employed. The remaining target number of images may then, e.g., be output for presentation (e.g., as described above with reference to step 714 of FIG. 7).

Exemplary Hardware and Software

Figure 9:
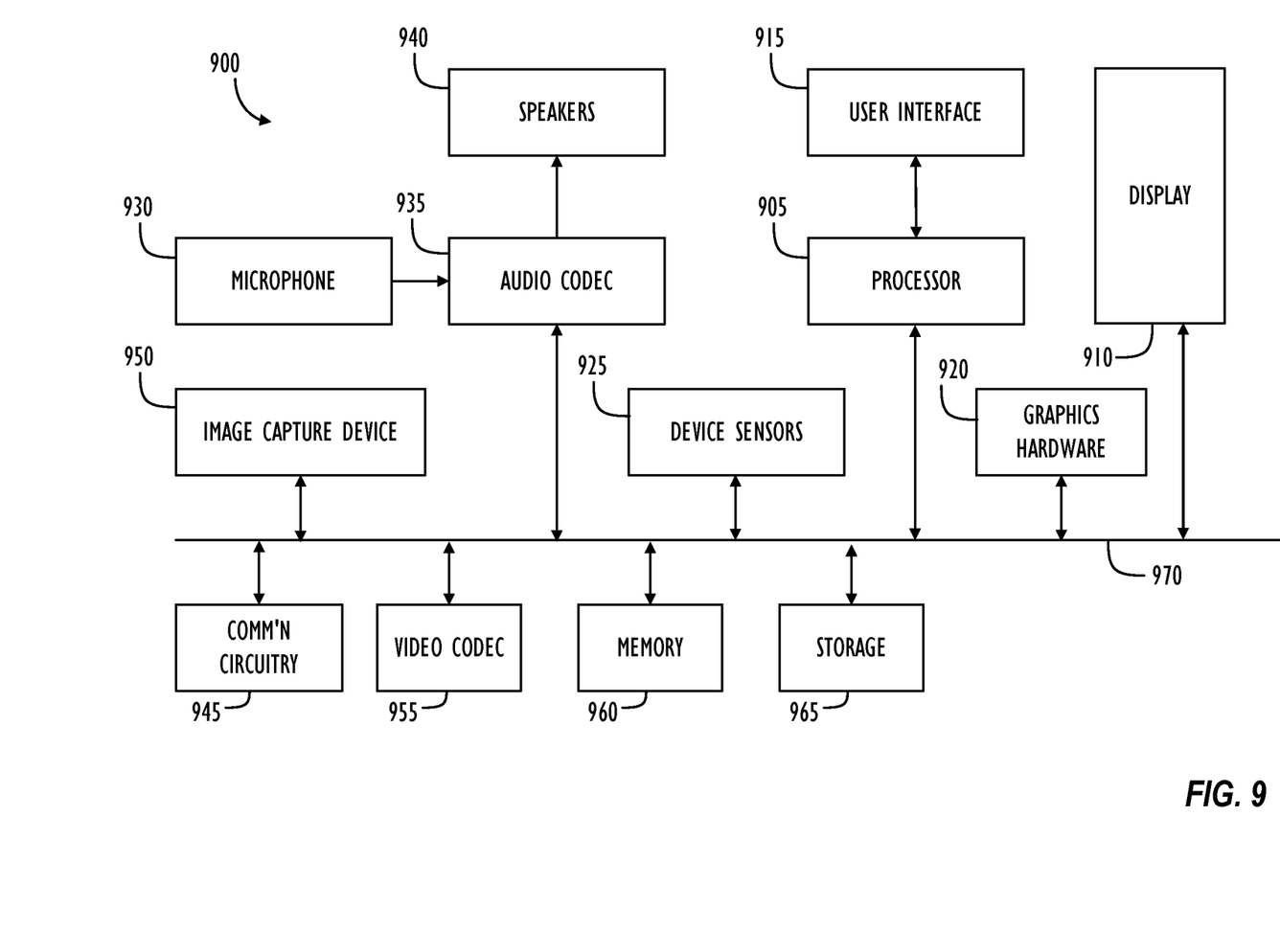
FIG. 9 shows a functional block diagram of a programmable electronic device, according to one embodiment.

Referring now to FIG. 9, a simplified functional block diagram of illustrative programmable electronic device 900 is shown according to one embodiment. Electronic device 900 could be, for example, a mobile telephone, personal media device, portable camera, or a tablet, notebook or desktop computer system. As shown, electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, image capture device 950, which may, e.g., comprise multiple camera units/optical image sensors having different characteristics or abilities (e.g., High Dynamic Range (HDR), Optical Image Stabilization (OIS) systems, optical zoom, digital zoom, etc.), video codec(s) 955, memory 960, storage 965, and communications bus 970.

Processor 905 may execute instructions necessary to carry out or control the operation of many functions performed by electronic device 900 (e.g., such as selecting images from a sequence of images in accordance with the various embodiments described herein). Processor 905 may, for instance, drive display 910 and receive user input from user interface 915. User interface 915 can take a variety of forms, such as a button, keypad, dial, a click wheel, keyboard, display screen and/or a touch screen. User interface 915 could, for example, be the conduit through which a user may view a captured video stream and/or indicate particular image(s) that the user would like to capture (e.g., by clicking on a physical or virtual button at the moment the desired image is being displayed on the device's display screen). In one embodiment, display 910 may display a video stream as it is captured while processor 905 and/or graphics hardware 920 and/or image capture circuitry contemporaneously generate and store the video stream in memory 960 and/or storage 965. Processor 905 may be a system-on-chip such as those found in mobile devices and include one or more dedicated graphics processing units (GPUs). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 perform computational tasks. In one embodiment, graphics hardware 920 may include one or more programmable graphics processing units (GPUs).

Image capture device 950 may comprise one or more camera units configured to capture images, e.g., images which may be processed to generate depth/disparity information for such captured images, e.g., in accordance with this disclosure. Output from image capture device 950 may be processed, at least in part, by video codec(s) 955 and/or processor 905 and/or graphics hardware 920, and/or a dedicated image processing unit or image signal processor incorporated within image capture device 950. Images so captured may be stored in memory 960 and/or storage 965. Memory 960 may include one or more different types of media used by processor 905, graphics hardware 920, and image capture device 950 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to retain computer program instructions or code organized into one or more modules and written in any desired computer programming language. When executed by, for example, processor 905, such computer program code may implement one or more of the methods or processes described herein.

It is to be understood that the above description is intended to be illustrative, and not restrictive. For example, a sequence of images can be obtained from a variety of imaging devices which include, but are not limited to still imaging devices, video devices, non-visible light imaging devices, etc. It can be understood that various techniques may be used to detect and locate objects, determine trajectories for objects, and score the determined trajectories. Determining and aggregating trajectory scores may also be tuned to address specific scenarios.

Many other embodiments will be apparent to those of skill in the art upon reviewing the above description. The scope of the invention therefore should be determined with reference to the appended claims, along with the full scope of equivalents to which such claims are entitled.

The invention claimed is:

1. A computer-implemented method for image selection, the method comprising:
   obtaining a sequence of images;
   detecting one or more objects in one or more images of the sequence of images;
   determining a location of each detected object in the one or more images;
   determining a trajectory of each detected object based on the determined location of each respective detected object in two or more images of the sequence of images;
   determining a score for the trajectory of each detected object, wherein the score is associated with the respective detected object;
   determining a set of selected images based on the scores associated with each detected object in two or more images of the sequence of images; and
   outputting the set of selected images for presentation.

2. The method of claim 1, wherein the set of selected images is based on a sum of the scores for each detected object in each respective image.

3. The method of claim 1, wherein the determining the set of selected images comprises:
   selecting a first subset of images from the sequence of images based on a sum of the scores for each detected object in each respective image;
   determining, for one or more images of the sequence of images, motion angles for the trajectory for the one or more detected objects in each respective image;
   selecting a second subset of images from the sequence of images based on the determined motion angles; and
   combining the first and second subsets of images as the set of selected images.

4. The method of claim 3, wherein the first and second subsets of images are combined in temporal order.

5. The method of claim 4, further comprising removing a first image from the first and second subsets of selected images based on how similar the first image is to neighboring images in the first and second subsets of selected image.

6. The method of claim 3, wherein the motion angle for a first trajectory of a detected object of a first image is based on a comparison of:
   (a) a location of the detected object for the first trajectory in a second image that is prior to the first image; and
   (b) a location of the detected object for the first trajectory in a third image that is after the first image.

7. The method of claim 3, wherein selecting the second subset of images from the sequence of images based on the motion angles comprises selecting, for each detected object, images associated with a local maximum motion angle for the trajectory of each detected object.

8. The method of claim 1, further comprising discarding objects based on their respective confidence scores when a number of detected objects in an image in the sequence of images exceeds a threshold number of detected objects.

9. The method of claim 1, further comprising:
   determining a trajectory confidence score for the trajectory of each detected object; and
   discarding trajectories based on one or more metrics until a number of detected objects is below a maximum number of tracked trajectories.

10. The method of claim 9, wherein determining the trajectory confidence score comprises:
    determining, for each image having an identified object, a local confidence score for each identified object in each respective image; and
    combining local confidence scores for each identified object into a trajectory confidence score for each respective image.

11. The method of claim 1, wherein the score comprises a trajectory waypoint score and wherein the set of selected images is determined based on an aggregation of the scores.

12. A non-transitory program storage device comprising instructions stored thereon to cause one or more processors to:
    obtain a sequence of images;
    detect one or more objects in one or more images of the sequence of images;
    determine a location of each detected object in the one or more images;
    determine a trajectory of each detected object based on the determined location of each respective detected object in two or more images of the sequence of images;
    determine a score for the trajectory of each detected object, wherein the score is associated with the respective detected object;
    determine a set of selected images based on the scores associated with each detected object in two or more images of the sequence of images; and
    output the set of selected images for presentation.

13. The non-transitory program storage device of claim 12, wherein the set of selected images is based on a sum of the scores for each detected object in each respective image.

14. The non-transitory program storage device of claim 12, wherein the instructions to determine the set of selected images further cause the one or more processors to:
    select a first subset of images from the sequence of images based on a sum of the scores for each detected object in each respective image;
    determine, for one or more images of the sequence of images, motion angles for the trajectory for the one or more detected object in each respective image;

select a second subset of images from the sequence of images based on the determined motion angles; and
combine the first and second subsets of images as the set of selected images.

15. The non-transitory program storage device of claim 14, wherein the first and second subsets of images are combined in temporal order.

16. The non-transitory program storage device of claim 15, wherein the instructions further cause the one or more processors to remove a first image from the first and second subsets of selected images based on how similar the first image is to neighboring images in the first and second subsets of selected image.

17. The non-transitory program storage device of claim 14, wherein the motion angle for a first trajectory of a detected object of a first image is based on a comparison of:
 (a) a location of the detected object for the first trajectory in a second image that is prior to the first image; and
 (b) a location of the detected object for the first trajectory in a third image that is after the first image.

18. The non-transitory program storage device of claim 14, wherein the instructions to select the second subset of images from the sequence of images based on the motion angles further cause the one or more processors to select, for each detected object, images associated with a local maximum motion angle for the trajectory of each detected object.

19. The non-transitory program storage device of claim 12, wherein the instructions further cause the one or more processors to:
 discard objects based on their respective confidence scores when a number of detected objects in an image in the sequence of images exceeds a threshold number of detected objects.

20. The non-transitory program storage device of claim 12, wherein the instructions further cause the one or more processors to:
 determine a trajectory confidence score for the trajectory of each detected object; and
 discard trajectories based on one or more metrics until a number of detected objects is below a maximum number of tracked trajectories.

21. The non-transitory program storage device of claim 12, wherein the score comprises a trajectory waypoint score and wherein the set of selected images is determined based on an aggregation of the scores.

22. An electronic device, comprising:
 a memory;
 one or more image capture devices;
 a display;
 a user interface; and
 one or more processors operatively coupled to the memory, wherein the one or more processors are configured to execute instructions causing the one or more processors to:
  obtain a sequence of images;
  detect one or more objects in one or more images of the sequence of images;
  determine a location of each detected object in the one or more images;
  determine a trajectory of each detected object based on the determined location of each respective detected object in two or more images of the sequence of images;
  determine a score for the trajectory of each detected object, wheein the score is associated with the respective detected object;
  determine a set of selected images based on the scores associated with each detected object in two or more images of the sequence of images; and
  output the set of selected images for presentation.

23. The device of claim 22, wherein the score comprises a trajectory waypoint score and wherein the set of selected images is determined based on an aggregation of the scores.

* * * * *

UNITED STATES PATENT AND TRADEMARK OFFICE
CERTIFICATE OF CORRECTION

PATENT NO. : 11,488,374 B1
APPLICATION NO. : 16/578825
DATED : November 1, 2022
INVENTOR(S) : Wei Sun et al.

It is certified that error appears in the above-identified patent and that said Letters Patent is hereby corrected as shown below:

In the Claims

Claim 11, at Column 14, Line 35, replace "traj ectory" with -- trajectory --

Claim 22, at Column 16, Line 28, replace "wheein" with -- wherein --

Signed and Sealed this
Twenty-seventh Day of December, 2022

Katherine Kelly Vidal
*Director of the United States Patent and Trademark Office*